(12) United States Patent
Wu (10) Patent No.: US 10,472,011 B2
(45) Date of Patent: Nov. 12, 2019

(54) BICYCLE RENTAL SYSTEM WITH MULTIPLE WAYS OF RENTING AND RETURNING BICYCLES

(71) Applicant: MICROPROGRAM INFORMATION CO., LTD., Taichung (TW)

(72) Inventor: Teng Yan Wu, Taichung (TW)

(73) Assignee: Microprogram Information Co., Ltd., Taichung (TW)

(*) Notice: Subject to any disclaimer, the term of this patent is extended or adjusted under 35 U.S.C. 154(b) by 0 days.

(21) Appl. No.: 16/119,677

(22) Filed: Aug. 31, 2018

(65) Prior Publication Data

US 2019/0071144 A1    Mar. 7, 2019

(30) Foreign Application Priority Data

Sep. 7, 2017 (TW) .............................. 106130700 A (51) Int. Cl.
| | |
|---|---|
| *G08B 21/00* | (2006.01) |
| *B62H 5/20* | (2006.01) |
| *G07C 9/00* | (2006.01) |
| *G06Q 30/06* | (2012.01) |

(52) U.S. Cl.
CPC ........... *B62H 5/20* (2013.01); *G06Q 30/0645* (2013.01); *G07C 9/00182* (2013.01); *G07C 2009/00293* (2013.01)

(58) Field of Classification Search
CPC ...... B62H 2003/005; B62H 5/06; B62H 5/20; G06Q 30/0645; G07C 2009/00293; G07C 9/00182; H04W 4/02

USPC .......................................................... 340/5.7
See application file for complete search history.

(56) References Cited

U.S. PATENT DOCUMENTS

| | | | | |
|---|---|---|---|---|
| 2005/0159988 A1* | 7/2005 | Ramseyer | ............ | G06Q 10/02 705/5 |
| 2007/0158949 A1* | 7/2007 | Le Gars | ............ | B60Q 11/002 290/7 |
| 2007/0239478 A1* | 10/2007 | Yui | ............ | G06Q 20/127 705/307 |
| 2009/0240575 A1* | 9/2009 | Bettez | ............ | B62H 3/00 705/13 |
| 2010/0228405 A1* | 9/2010 | Morgal | ............ | B62H 3/02 701/2 |
| 2011/0226708 A1* | 9/2011 | Mercat | ............ | B62H 3/02 211/5 |
| 2015/0070170 A1* | 3/2015 | Margalit | ............ | G07F 7/0681 340/572.1 |

\* cited by examiner

Primary Examiner — Mark S Rushing
(74) Attorney, Agent, or Firm — Wang Law Firm, Inc.

(57) ABSTRACT

A bicycle rental system includes a plurality of rental bicycles, each of which has a locking apparatus, a controlling apparatus, and a parking locker. The locking apparatus is operated to lock the rental bicycle, and the parking locker is able to engage and lock a dock locker of the dock. The controlling apparatus transmits signals to a control system, and receives signals from the control system through a network. The bicycle rental system may return the rental bicycle with or without the docks, and may rent the rental bicycle by a mobile device or a tag device.

4 Claims, 15 Drawing Sheets

BICYCLE RENTAL SYSTEM WITH MULTIPLE WAYS OF RENTING AND RETURNING BICYCLES

BACKGROUND OF THE INVENTION

1. Technical Field

The present invention relates to a bicycle rental system, and more particularly to a bicycle rental system having different ways of renting and returning bicycles.

2. Description of Related Art

A conventional bicycle rental system sets up a plurality of rental stations in the city. Each of the rental stations has a plurality of docks to park bicycle, and people may operate the dock to rent or return a bicycle. A power line and a network should be connected to all the docks for the rental procedure. Such rental system has advantages, including easy management of the system and the bicycles. But it also has some disadvantages, for example, it needs a high cost to build up the rental stations, and the user has to find the rental station to rent and return the rental bicycles.

Another conventional bicycle rental system needs no rental stations. All the rental bicycles have a code. The user operates a mobile device, such as smartphone, which is installed with a specific APP, to scan the code on the rental bicycle for renting and returning the rental bicycle. Such system has some advantages, such as the user may rent the return bicycles in any place, and some disadvantages, such as the rental bicycle will not be operated when the code is damaged.

These two conventional bicycle rental systems have their own advantages and disadvantages. The main difference is that the first bicycle rental system needs fixed power line and network, and the second first bicycle rental system needs internet.

BRIEF SUMMARY OF THE INVENTION

In view of the above, the primary objective of the present invention is to provide a bicycle rental system, which provides a low setting up cost and an easy way of management.

The secondary objective of the present invention is to provide a bicycle rental system, which has different ways of renting and returning the rental bicycles.

The third objective of the present invention is to provide a bicycle rental system, which provides docks needing no power nor network.

In order to achieve the objective of the present invention, a bicycle rental system includes a fixed dock; a rental bicycle including a locking apparatus, a bicycle locking device, and a controlling apparatus, wherein the controlling apparatus includes a processor, to which a display, a code generating module, a transceiver module, a reader module, and a positioning module are electrically connected; and a control system receiving signals from the transceiver module of the rental bicycle and transmitting signals to the transceiver module of the rental bicycle.

The rental bicycle is rented through a first rental process or a second rental process.

In the first rental process, the code generating module generates a rental code by a control of the processor, and the rental code is scanned by a mobile device. The mobile device transmits the rental code and a user data to the control system to complete the first rental process.

In the second rental process, a user operates a tag device to be detected by the reader module of the controlling apparatus of the rental bicycle to obtain a user data, and then the transceiver module is controlled by the processor to transmit the user data and a position data, which is obtained by the positioning module, to the control system to complete the second rental process.

The rental bicycle is returned through a return process without dock or a return process with dock, including:

In the return process without dock, a user engages the bicycle locking device with the locking apparatus to lock the rental bicycle, and then the transceiver module of the rental bicycle is controlled by the processor to transmit a return signal and a position data to the control system to complete the return process without dock.

In the return process with dock, a user locks the rental bicycle to the dock, and then the transceiver module of the rental bicycle is controlled by the processor to transmit a return signal and a position data to the control system to complete the return process with dock.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
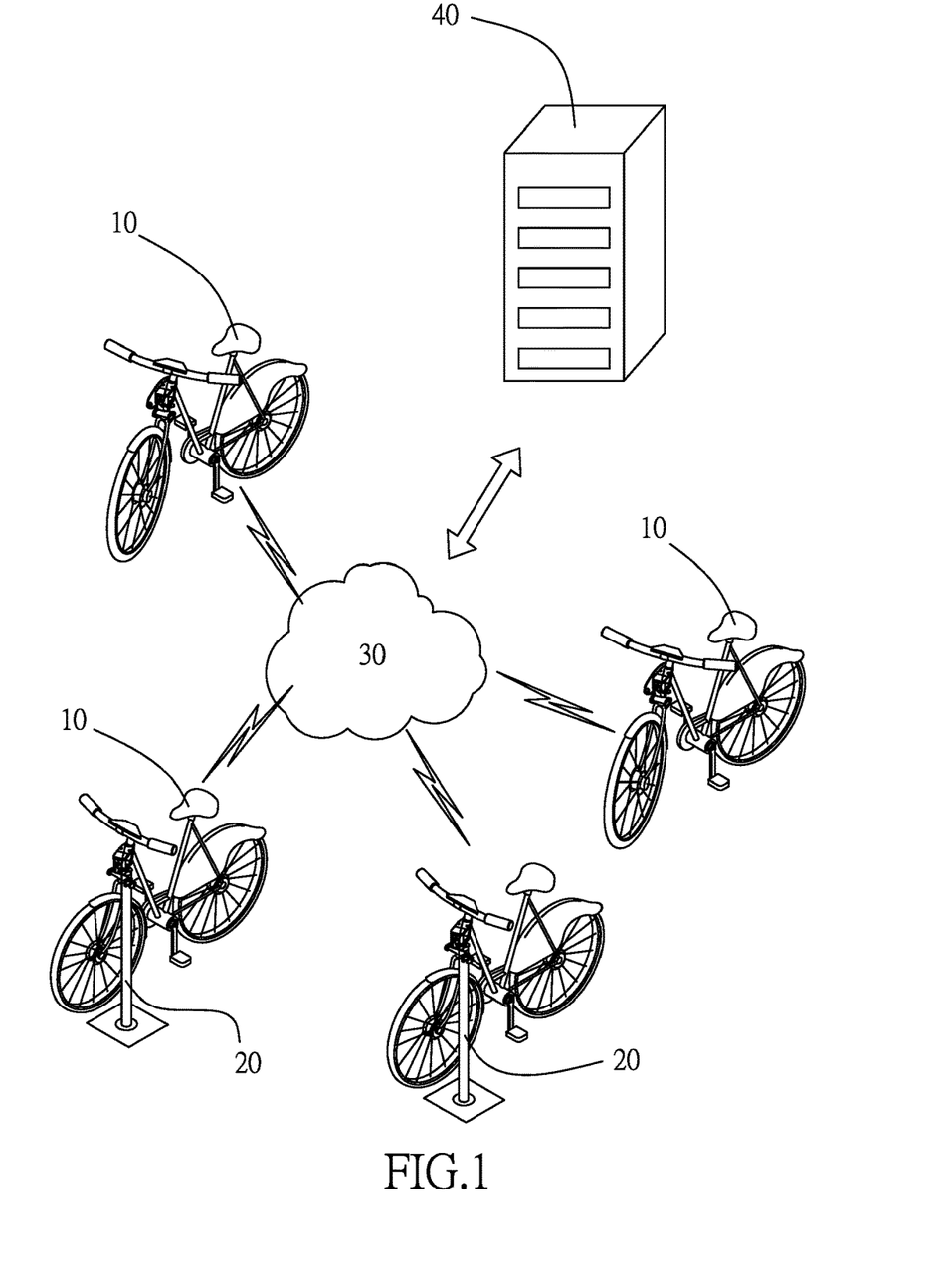
FIG. 1 is a sketch diagram of a preferred embodiment of the present invention.

FIG. 1 shows a bicycle rental system of the preferred embodiment of the present invention, which includes a plurality of rental bicycles 10, a plurality of docks 20, a network 30, and a control system 40. It also shows that some of the rental bicycles 10 are rented and returned with the docks 20, and some of them are rented and returned without the docks 20.

Figure 2:
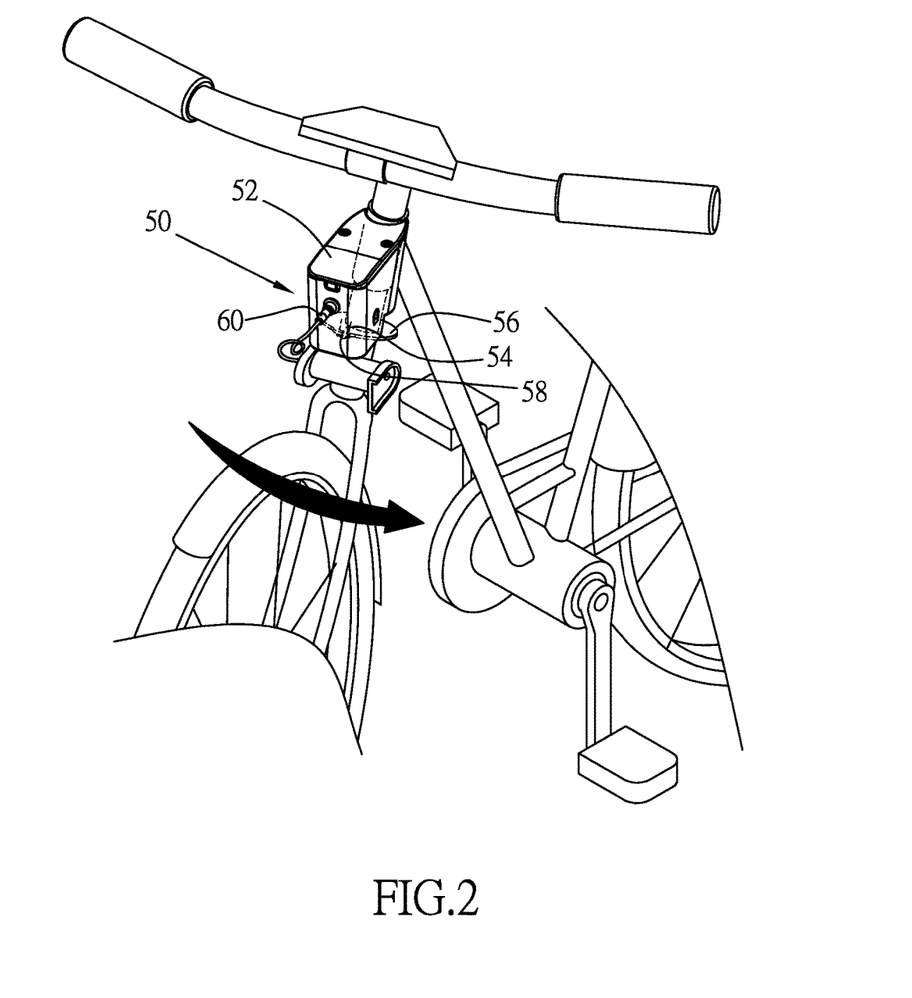
FIG. 2 is a perspective view of the rental bicycle of the preferred embodiment of the present invention.

As shown in FIG. 2, each of the rental bicycles 10 has a locking apparatus 50, which includes a locking member 52 and a locking board 56. The locking member 52 has a latch 54, and the locking board 56 has a slot 58. The latch 54 could be moved out of the locking member 52, or received in the locking member 52. The locking member 52 is mounted on a frame of the rental bicycle 10, and precisely, it is mounted on a head tube of the frame of the rental bicycle 10. The locking board 56 is mounted on a front fork of the rental bicycle 10, so that the locking board 56 is turned along with a handlebar of the rental bicycle 10 to align the slot 58 with the latch 54.

Each of the rental bicycles 10 further includes a bicycle locking device 60. The bicycle locking device 60 has a cable connected to the frame of the rental bicycle 10 and a pin on a distal end of the cable. The pin of the bicycle locking device 60 is able to be inserted into the locking member 52 to move the latch 54 out and engage the slot 58 of the locking board 56. As a result, the front fork of the rental bicycle 10 is locked and unable to turn.

Figure 3:
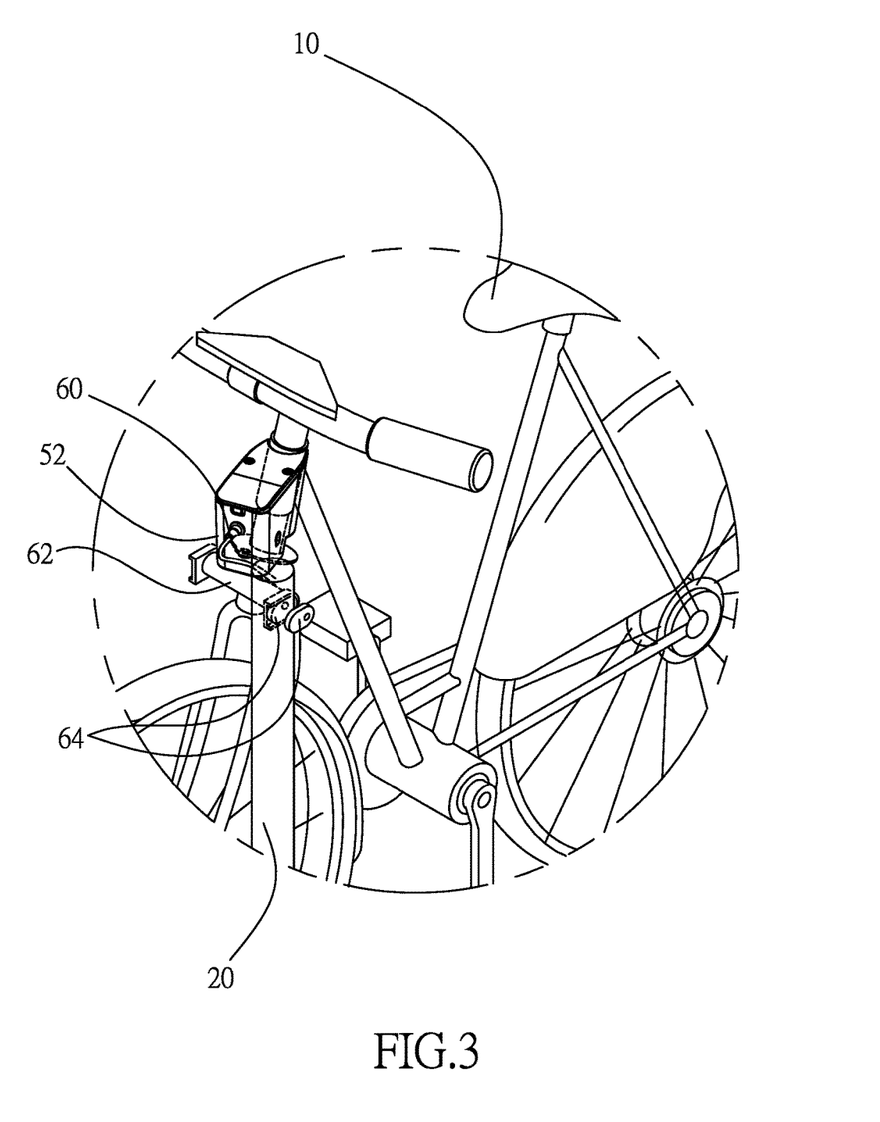
FIG. 3 is a perspective view of the rental bicycle of the preferred embodiment of the present invention, showing the rental bicycle being locked to the dock.

As shown in FIG. 3, the rental bicycle 10 further has a parking locker 62, and the dock 20 is provided with a dock locker 64. The parking locker 62 is able to engage and lock the dock locker 64 to lock the rental bicycle 10 to the dock 20 when the rental bicycle 10 parks by the dock 20.

Figure 4:
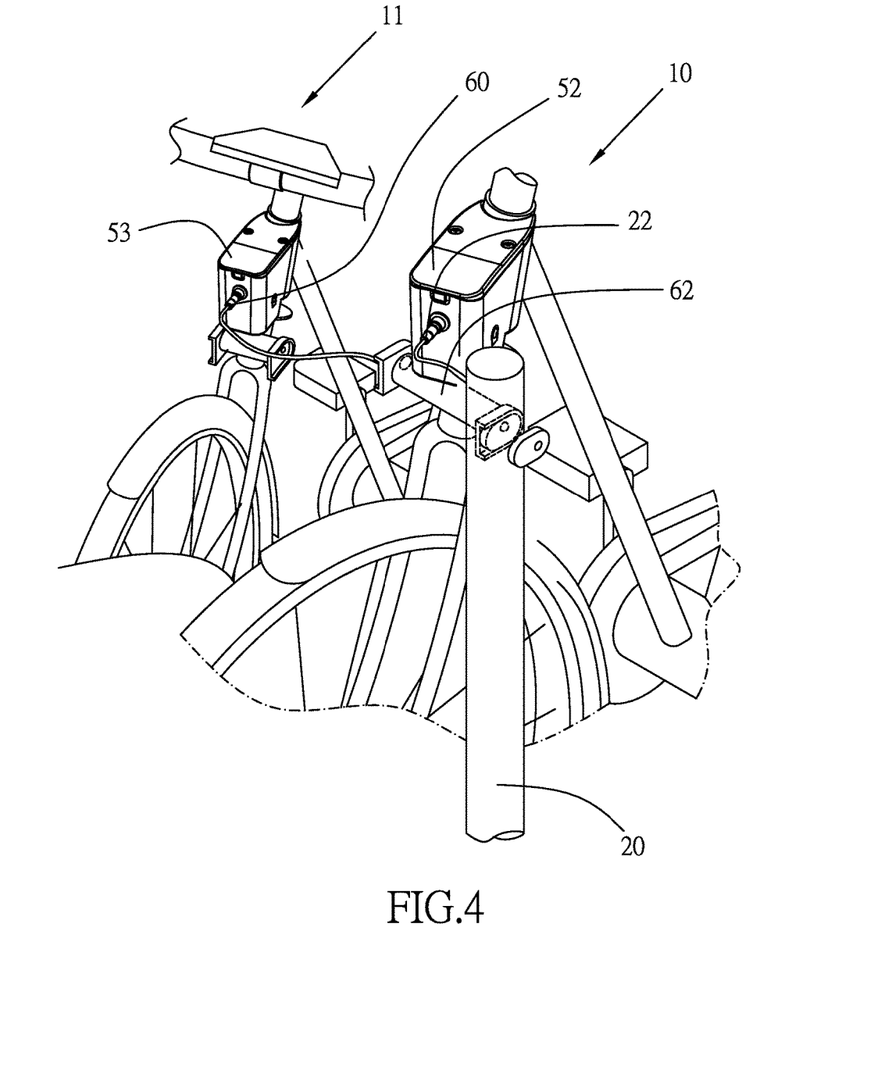
FIG. 4 is a perspective view of the rental bicycle of the preferred embodiment of the present invention, showing two rental bicycles being locked to the bicycle dock in series.

As shown in FIG. 4, a rental bicycle 10 is able to be locked to a rental bicycle 10 which already is locked to the dock 20. The rental bicycle (hereafter the first rental bicycle) 10 is locked to the dock 20 by inserting a dock locking device 22, which is the same as the bicycle locking device 60, into the locking member 52 of the first rental bicycle 10. When a user rides a rental bicycle (hereafter the second rental bicycle) 11 to a station and find no free dock 20, he/she may operate the bicycle locking device 60 of the first rental bicycle 10 to insert the pin into the locking member 52 of the second rental bicycle 11, so that the second rental bicycle 11 is locked to the dock 20 through the first rental bicycle 10. In other words, the first and the second rental bicycles 10 and 11 are locked in series. It is easy to understand that, a third, a fourth, and more rental bicycles 10 are able to be locked in series by the way as described above.

An alternate way is that the first rental bicycle 10 is parked and locked to the dock by engaging parking locker 62 of the first rental bicycle 10 with the dock locker 64 of the dock 20 as described above, and then the second rental bicycle 11 is parked by the first rental bicycle 10, and then pull the bicycle locking device 60 of the first rental bicycle 10 to insert the pin into the locking member 52 of the second rental bicycle 11 to park and lock the first and the second rental bicycles 10 and 11 in series.

Figure 5:
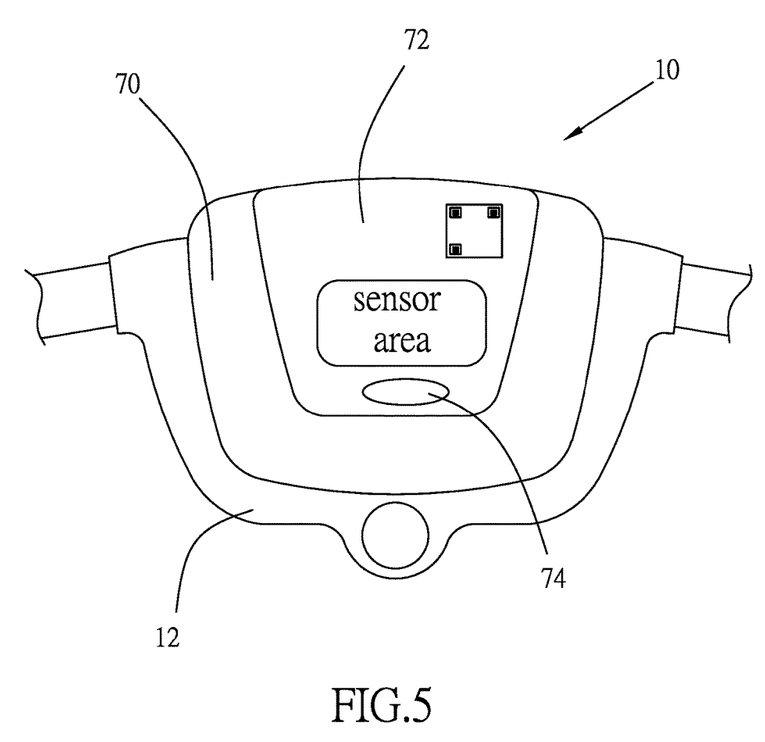
FIG. 5 is a sectional view of the controlling apparatus of the preferred embodiment of the present invention.

As shown in FIG. 5, the rental bicycle 10 is provided with a controlling apparatus 70 on the handlebar 12 thereof. The controlling apparatus 70 has a display 72 and a key 74. The key 74 is pressed to wake up the controlling apparatus 70 to show information on the display 72.

Figure 6:
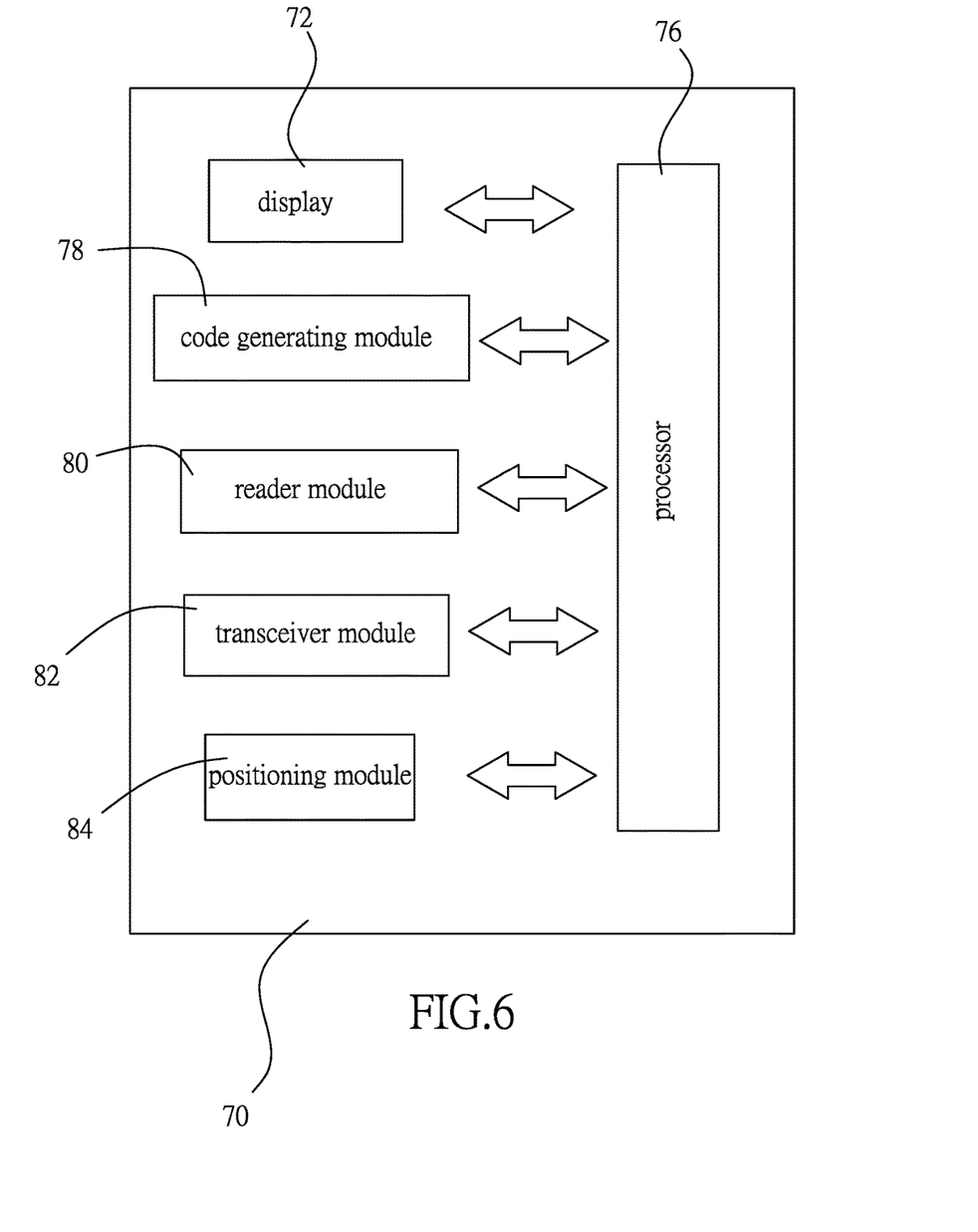
FIG. 6 is a block diagram of the controlling apparatus of the preferred embodiment of the present invention.

As shown in FIG. 6, the controlling apparatus 70 further includes a processor 76, to which the display 72, a code generating module 78, a reader module 80, a transceiver module 82, and a positioning module 84 are electrically connected. The code generating module 78 is controlled by the processor 76 to generate a rental code, and the rental code is shown in the display 72.

The reader module 80 is a RFID Reader Module to sense and read a tag. The tag could be a RFID tag, a smart card, or an electric ticket.

The transceiver module 82 receives and transmits signals by a wireless transmission, which may be 3G, 4G, Bluetooth, and Zigbee systems. The positioning module 84 is Global Positioning System (GPS).

Figure 7:
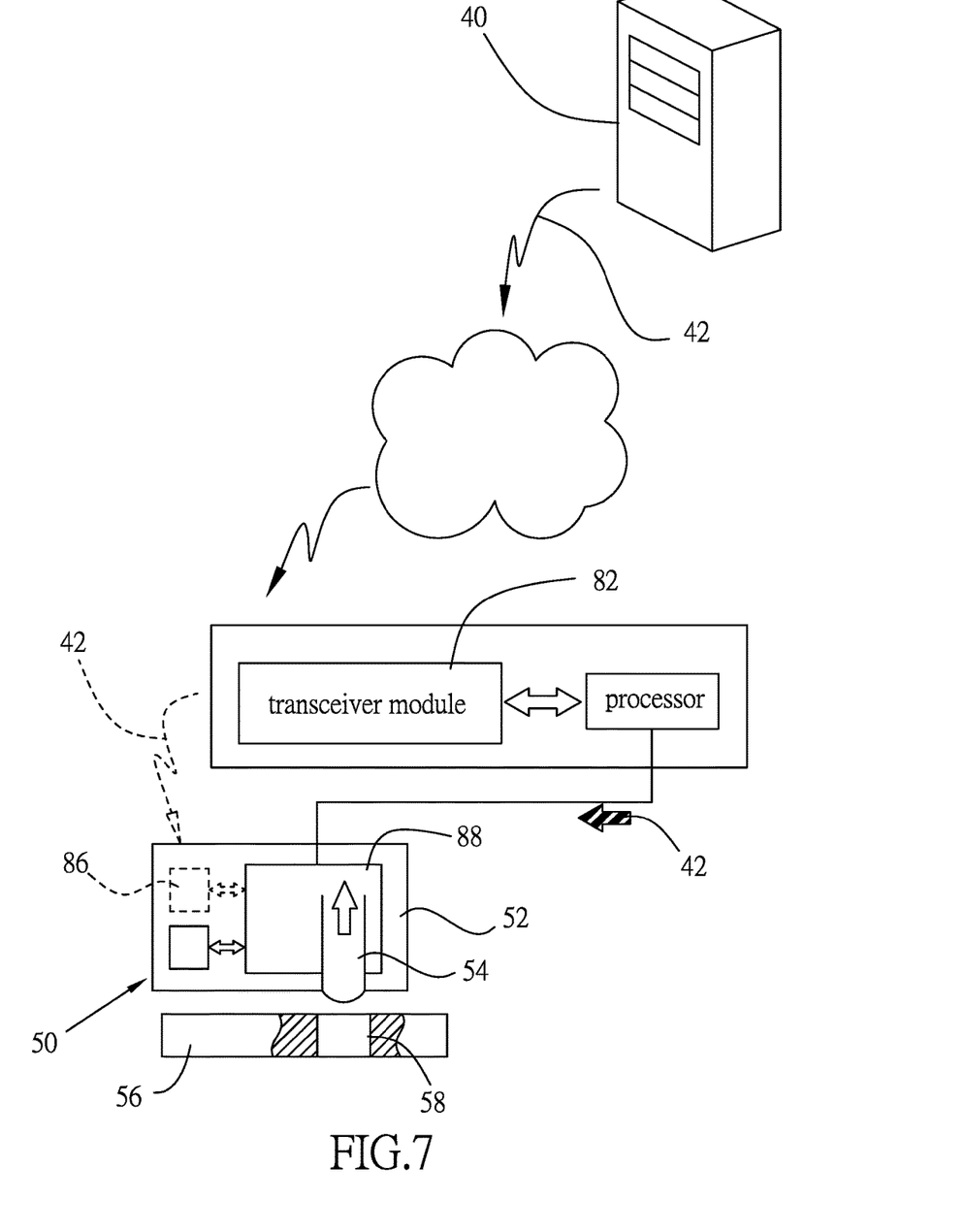
FIG. 7 is a sketch diagram of the preferred embodiment of the present invention, showing how to unlock the rental bicycle.

As shown in FIG. 7, the control system 40 transmits an unlocking signal 42 to the transceiver module 82 to activate a driving apparatus 88 in the locking member 52, so that the driving apparatus 88 moves the latch 54 to disengage the slot 58. As a result, the rental bicycle 10 is unlocked. In another embodiment, the unlocking signal 42 is transmitted to the transceiver module 82 through a short-distance transceiver 86 to activate the driving apparatus 88 in the locking member 52.

Figure 8:
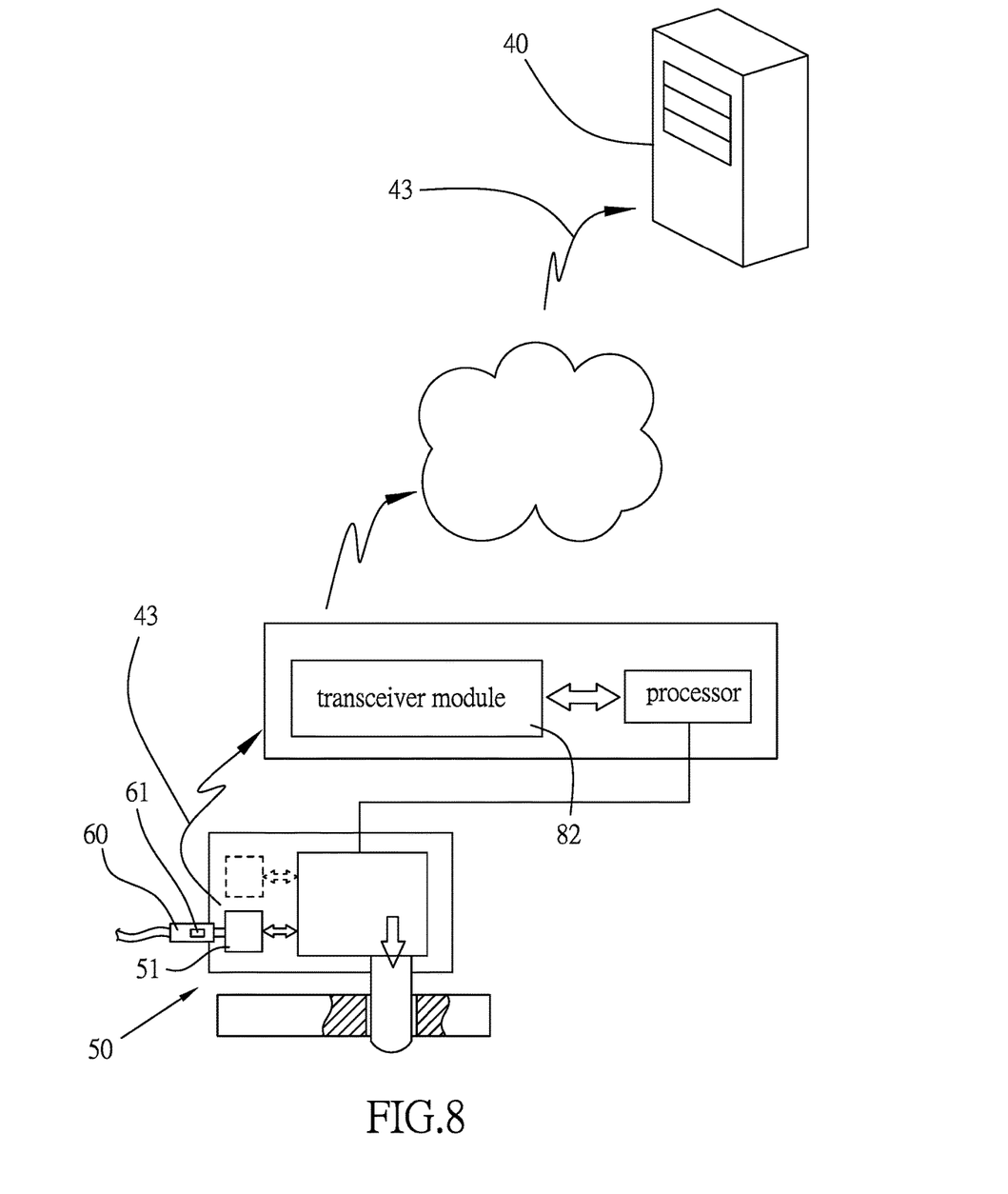
FIG. 8 is a sketch diagram of the preferred embodiment of the present invention, showing how to lock the rental bicycle.

As shown in FIG. 8, the locking apparatus 50 includes a first sensing member 51, and the bicycle locking device 60 has a second sensing member 61. The first sensing member 51 detects the second sensing member 61 when the pin of the bicycle locking device 60 engages the locking member 52, and then generates a return signal 43 transmitting to the control system 40 through the transceiver module 82.

Figure 9:
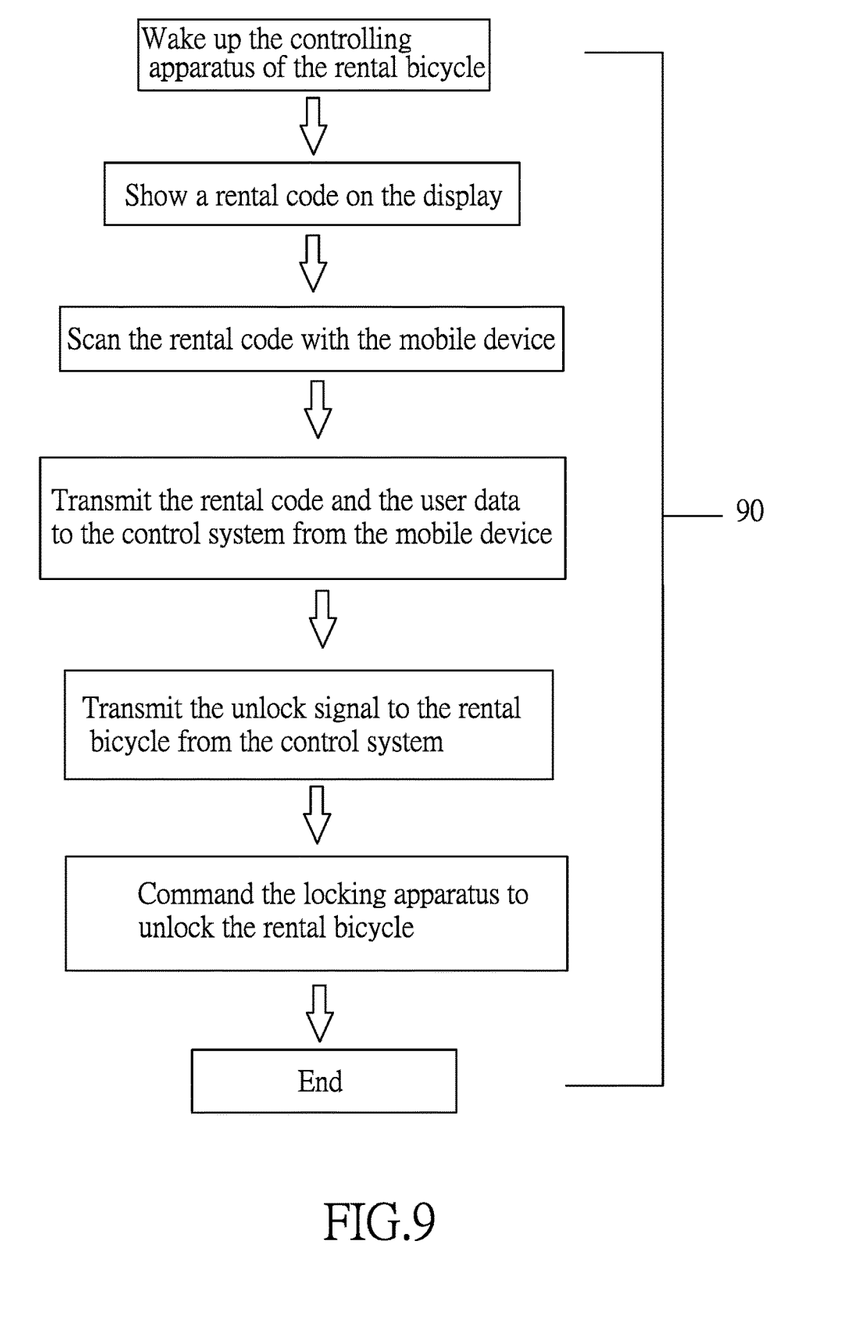
FIG. 9 is a flowchart of the first rental process of the preferred embodiment of the present invention.
Figure 10:
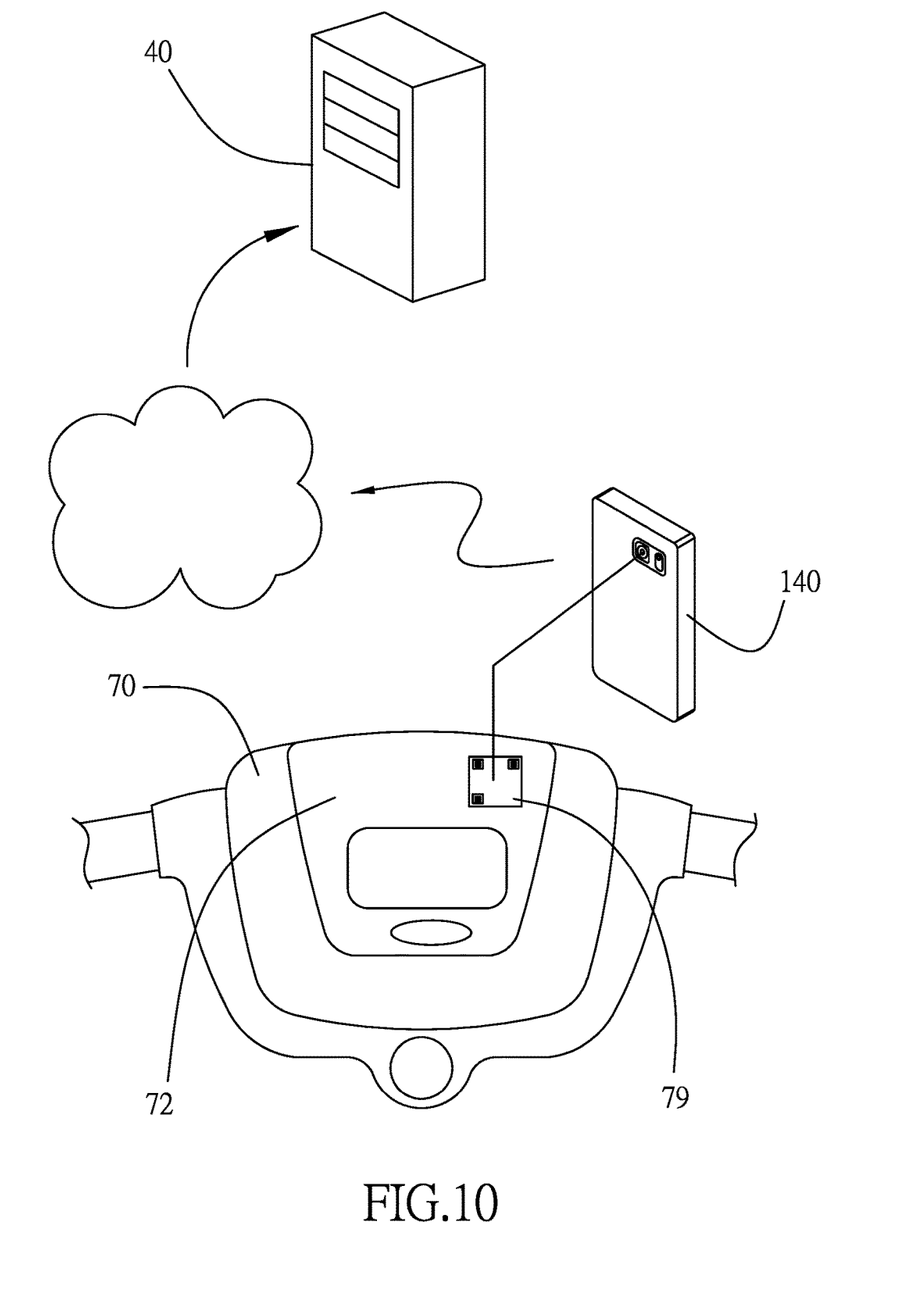
FIG. 10 is a sketch diagram of the first rental process of the preferred embodiment of the present invention.

As shown in FIGS. 7, 9, and 10, the preferred embodiment of the present invention provides a first rental process 90. In the first rental process 90, a user wakes the controlling apparatus 70 up by pressing the key 74, and then the code generating module 78 generates a rental code 79 and shows it on the display 72. Next, the user operates a mobile device 140 to scan the rental code 79 to decode the rental code 79 and transmit the rental code 79 and a user data to the control system 40. The control system 40 records the rental code 79 and the user data, and then transmits an unlocking signal 42 to the controlling apparatus 70, whereby the controlling apparatus 70 activates the driving apparatus 88 to disengage the latch 54 with the slot 58 to unlock the rental bicycle 10. As a result, the first rental process is completed, and the user may ride the rental bicycle 10.

Figure 11:
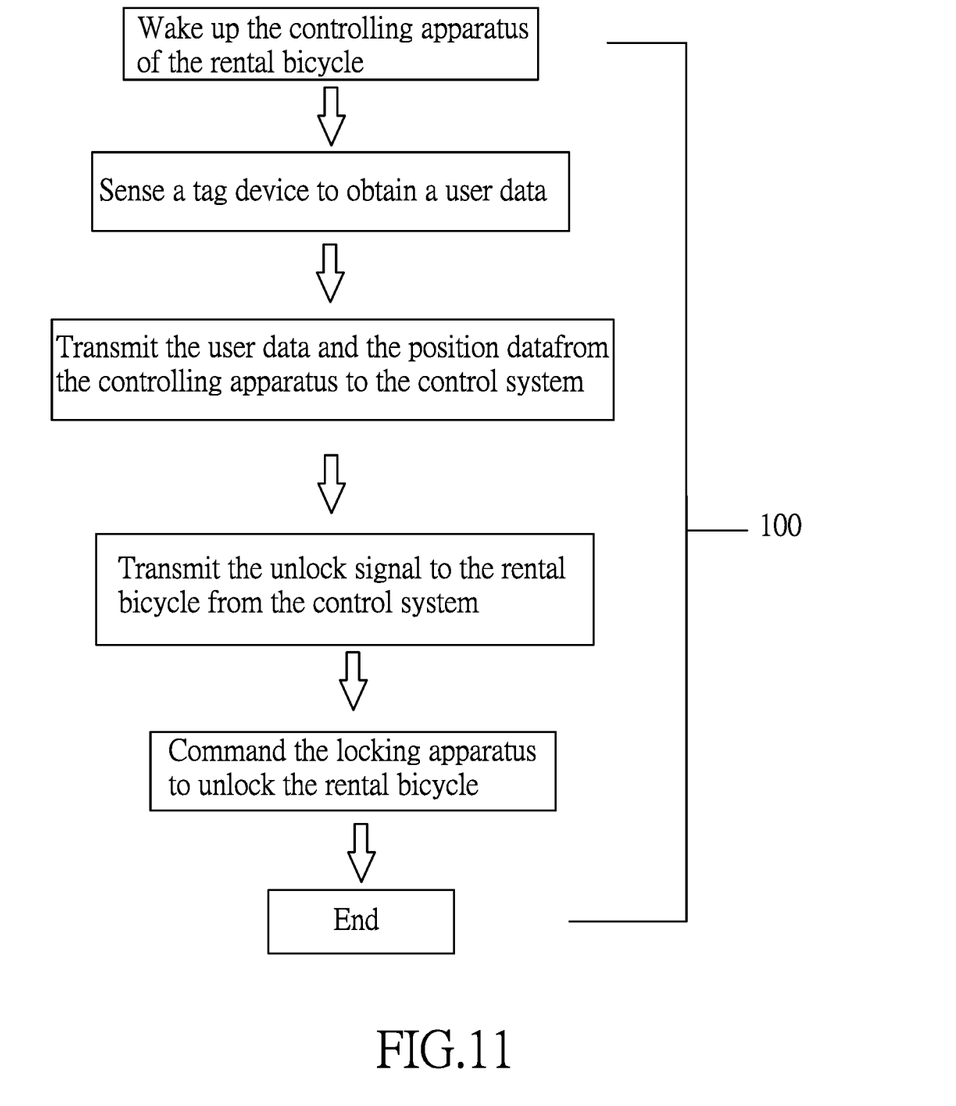
FIG. 11 is a flowchart of the second rental process of the preferred embodiment of the present invention.
Figure 12:
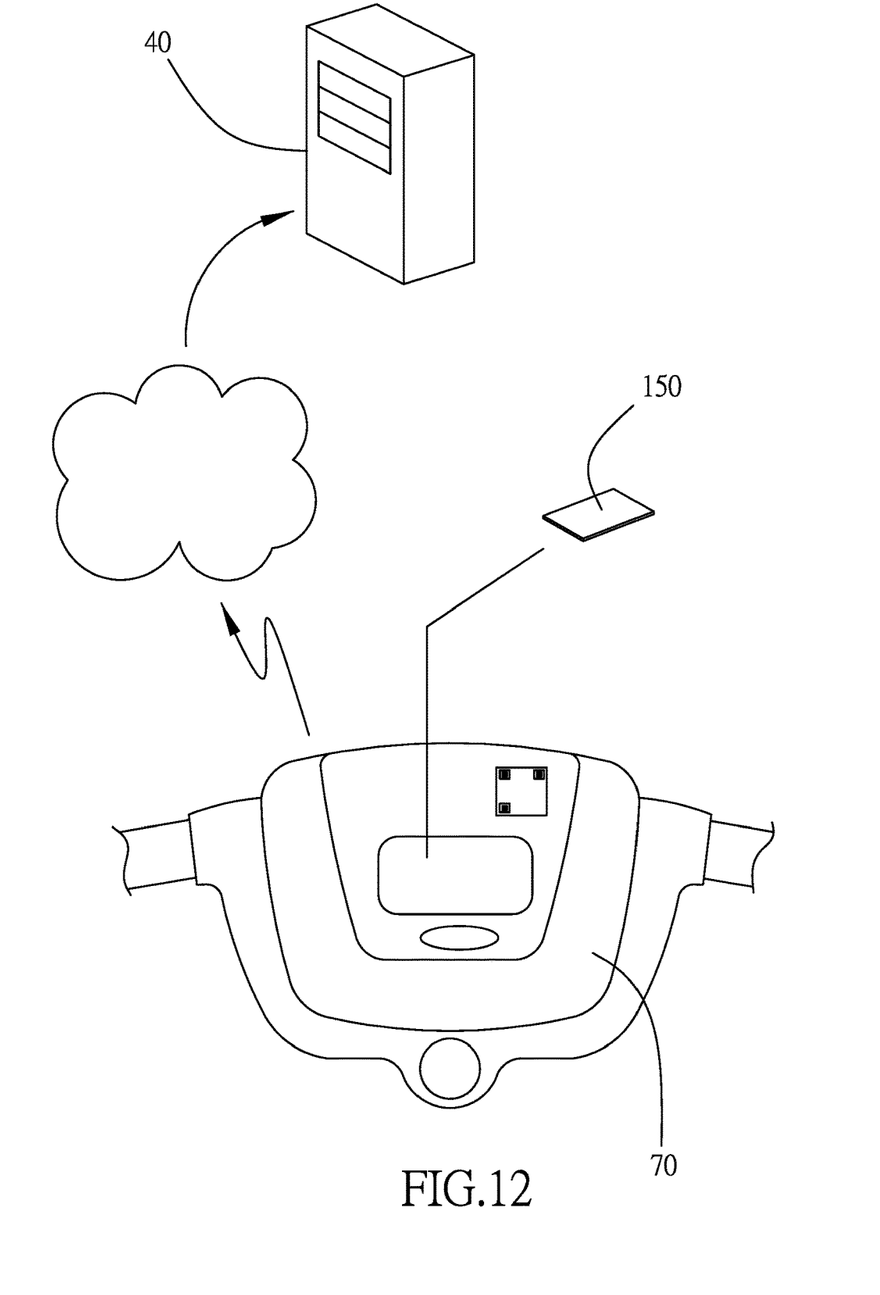
FIG. 12 is a sketch diagram of the second rental process of the preferred embodiment of the present invention.

As shown in FIGS. 7, 11, and 12, the preferred embodiment of the present invention provides a second rental process 100. In the second rental process 100, a user wakes the controlling apparatus 70 up by pressing the key 74, and then operates a tag device 150 to be sensed by a sensing device (not shown) in the controlling apparatus 70. The controlling apparatus 70 obtains a user data of the tag device 150, and transmits the user data and a position data of the rental bicycle 10 to the control system 40. The control system 40 records the user data and the position data, and then transmits an unlocking signal 42 to the controlling apparatus 70, whereby the controlling apparatus 70 activates the driving apparatus 88 to disengage the latch 54 with the slot 58 to unlock the rental bicycle 10. As a result, the first rental process is completed, and the user may ride the rental bicycle 10.

Figure 13:
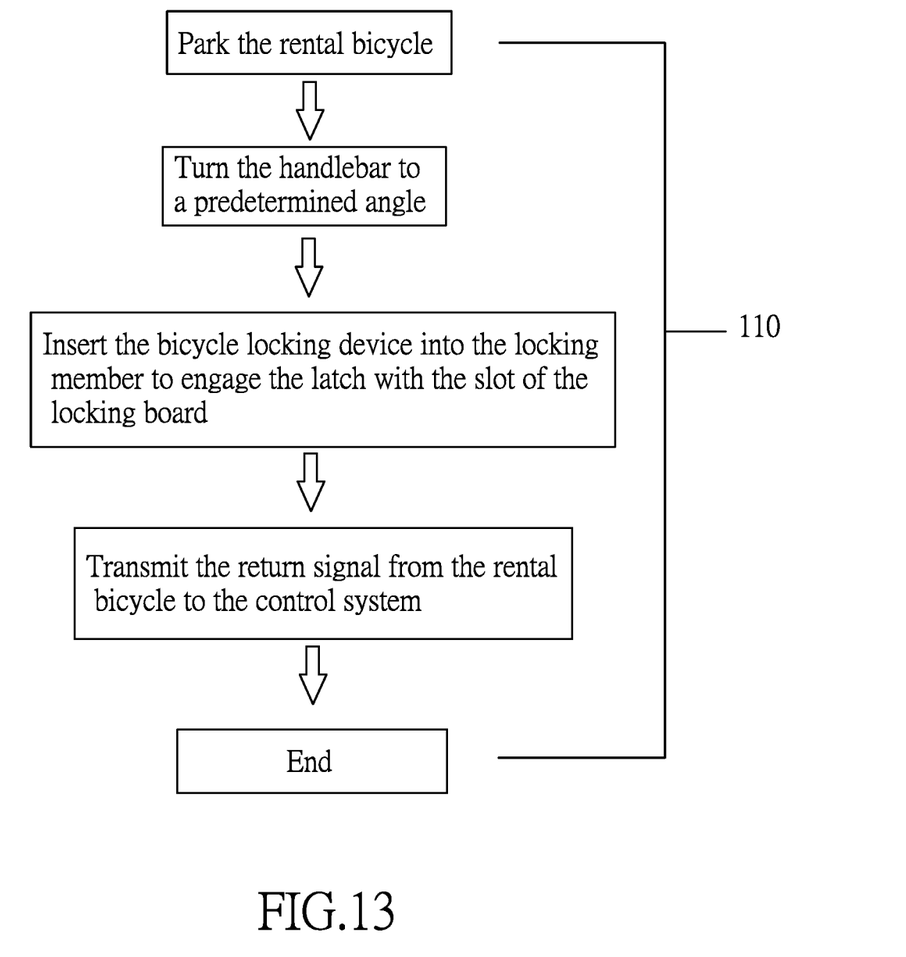
FIG. 13 is a flowchart of the return process without dock of the preferred embodiment of the present invention.

As shown in FIGS. 2, 8, and 13, the preferred embodiment of the present invention provides a return process without dock 110. In the return process without dock 110, a user turns the handlebar 12 of the rental bicycle 10 to a specified angle, and engages the bicycle locking device 60 with the locking member 52 of the locking apparatus 50 to move the latch 54 out and engage the slot 58 of the locking board 56. At this time, the first sensing member 51 detects the second sensing member 61 to generate a return signal 43 and transmit the return signal 43 to the control system 40 to complete the return process without dock 110.

Figure 14:
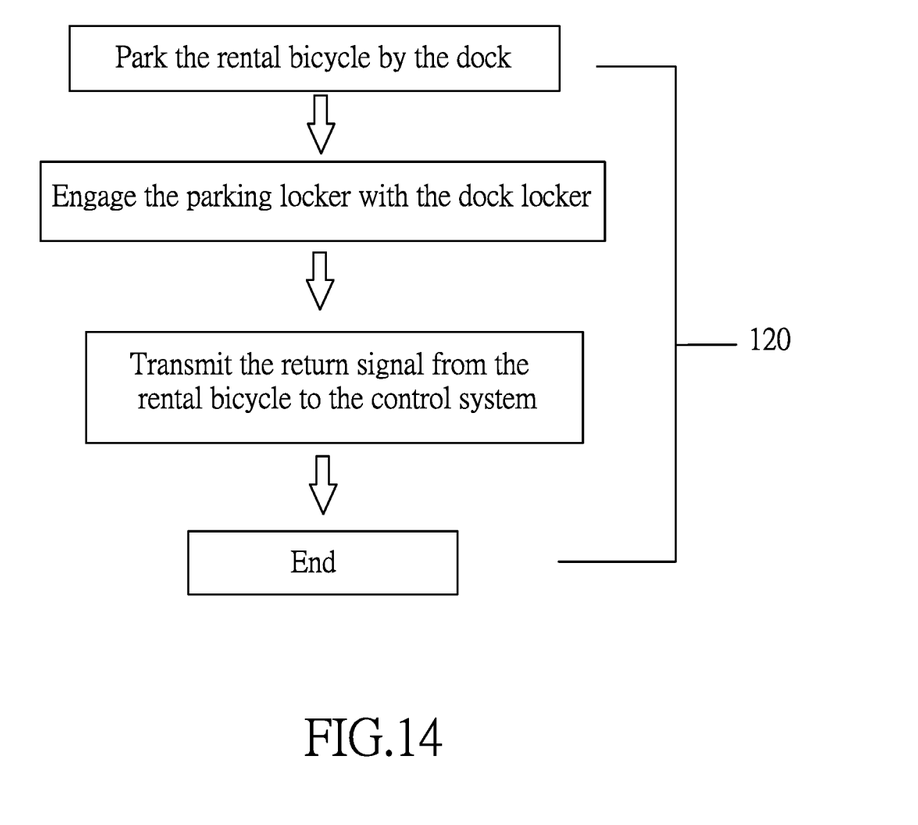
FIG. 14 is a flowchart of the return process with dock of the preferred embodiment of the present invention.

As shown in FIG. 3 and FIG. 14, the preferred embodiment of the present invention provides a return process with dock 120. In the return process with dock 120, a user parks the rental bicycle 10 by a dock 20, and then engages the parking locker 62 of the rental bicycle 10 with the dock locker 64 of the dock 20, and engages a dock locking device 22 with the locking member 52 of the rental bicycle 10 whereby the rental bicycle 10 is locked to the dock 20. Next, the transceiver module 82 transmits a return signal and a position data to the control system 40 to complete the return process with dock 120.

Figure 15:
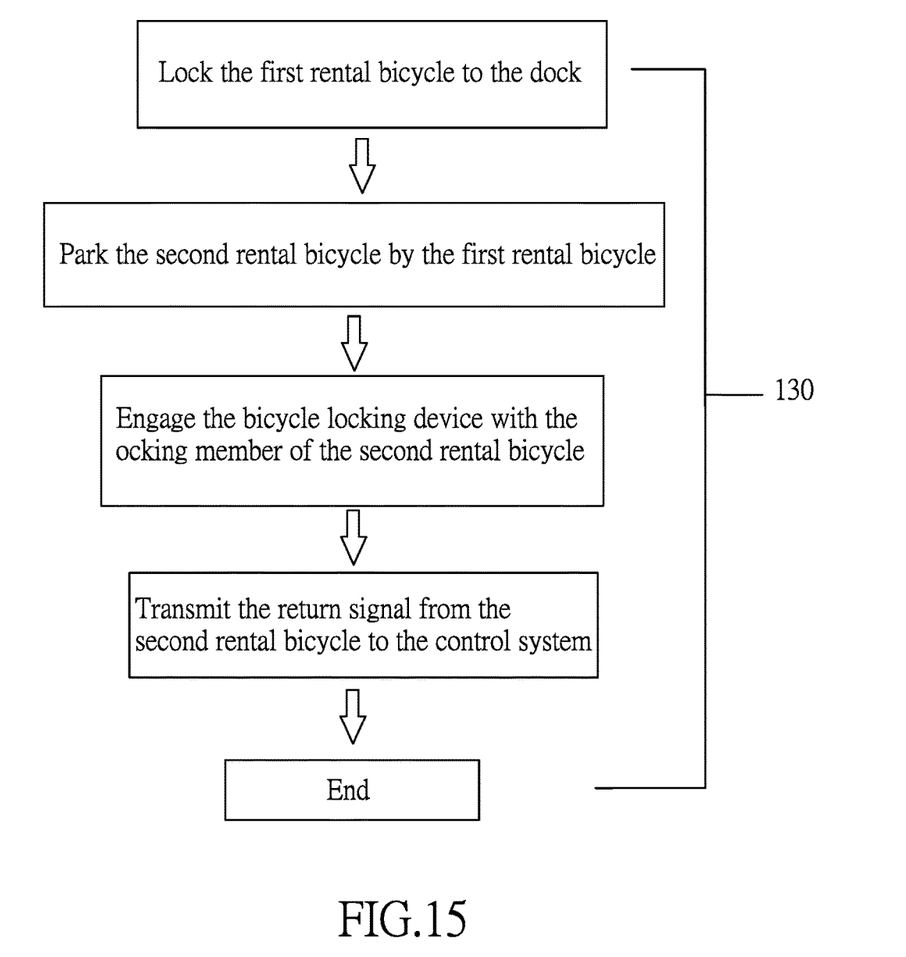
FIG. 15 is a flowchart of the return process of series connection of the preferred embodiment of the present invention.

As shown in FIG. 4 and FIG. 15, the preferred embodiment of the present invention provides a return process of series connection 130. In the return process of series connection 130, a user is able to connect a rental bicycle (hereafter the second rental bicycle) 11 to a rental bicycle (hereafter the first rental bicycle) 10, which had completed the return process with dock 120. The user inserts the bicycle locking device 60 of the first rental bicycle 10 into the locking member 52 of the second rental bicycle 11 to lock the second rental bicycle 11 by an engagement of the latch 54 and the slot 58 of the second rental bicycle 11. The same as above, the transceiver module 82 of the second rental bicycle 11 transmits a return signal and a position data to the control system 40 to complete the return process with dock 120. As a result, the first and the second rental bicycles 10 and 11 are locked in series, and the second rental bicycle 11 completes the return process of series connection 130.

In conclusion, the rental bicycles 10 of the preferred embodiment of the present invention are able to be rented and returned with or without the docks 20. Furthermore, the docks 20 of the preferred embodiment of the present invention have no power and network. They are just posts fixed on the ground and provided with the dock locking device 22 and the dock locker 64. All the devices for signal transmission are provided on the rental bicycles 10. As a result, the cost for building the stations are lower than the prior art, and the return process of series connection 130 may reduce the number of the docks must be built in the stations. The users may rent and return the rental bicycles 10 by a mobile device (like smartphone), a smartcard, or an electric ticket.

It must be pointed out that the embodiments described above are only some preferred embodiments of the present invention. All equivalent structures which employ the concepts disclosed in this specification and the appended claims should fall within the scope of the present invention.

What is claimed is:

1. A bicycle rental system, comprising:
a fixed dock;
a rental bicycle including a locking apparatus, a bicycle locking device, and a controlling apparatus, wherein the controlling apparatus includes a processor, to which a display, a code generating module, a transceiver module, and a positioning module are electrically connected;
a mobile device installed with a predetermined application; and
a control system receiving signals from the transceiver module of the rental bicycle and transmitting signals to the transceiver module of the rental bicycle;
wherein when a user rents the rental bicycle, the code generating module generates a rental code by a control of the processor, and the user operates the mobile device to scan the rental code; and then the mobile device transmits the rental code and a user data to the control system whereby the user is able to ride the rental bicycle;
wherein the rental bicycle is returned through a return process without dock or a return process with dock;
wherein in the return process without dock, a user engages the bicycle locking device with the locking apparatus to lock the rental bicycle, and then the transceiver module of the rental bicycle is controlled by the processor to transmit a return signal and a position data to the control system to complete the return process without dock;
wherein in the return process with dock, a user locks the rental bicycle to the dock, and then the transceiver module of the rental bicycle is controlled by the processor to transmit a return signal and a position data to the control system to complete the return process with dock
wherein the dock has a dock locker, and the rental bicycle has a parking locker; the parking locker engages the dock locker to lock the rental bicycle to the dock;
wherein when the parking locker of the rental bicycle engages the dock locker of the dock, the bicycle locking device of the rental bicycle is able to engage a pin into a locking apparatus of another rental bicycle to lock the rental bicycles in series.

2. The bicycle rental system of claim 1, wherein the control system transmits an unlocking signal to the controlling apparatus of the rental bicycle via the transceiver module to drive the locking apparatus to unlock the rental bicycle.

3. A bicycle rental system, comprising:
a fixed dock;
a rental bicycle including a locking apparatus, a bicycle locking device, and a controlling apparatus, wherein the controlling apparatus includes a processor, to which a display, a code generating module, a reader module, a transceiver module, and a positioning module are electrically connected;
a tag device; and
a control system receiving signals from the transceiver module of the rental bicycle and transmitting signals to the transceiver module of the rental bicycle;
wherein when a user rents the rental bicycle, the user operates the tag device to be detected by the reader module of the controlling apparatus of the rental bicycle to obtain a user data, and then the transceiver module is controlled by the processor to transmit the user data and a position data, which is obtained by the positioning module, to the control system whereby the user is able to ride the rental bicycle;
wherein the rental bicycle is returned through a return process without dock or a return process with dock;
wherein in the return process without dock, a user engages the bicycle locking device with the locking apparatus to lock the rental bicycle, and then the transceiver module of the rental bicycle is controlled by the processor to transmit a return signal and a position data to the control system to complete the return process without dock;
wherein in the return process with dock, a user locks the rental bicycle to the dock, and then the transceiver module of the rental bicycle is controlled by the processor to transmit a return signal and a position data to the control system to complete the return process with dock
wherein the dock has a dock locker, and the rental bicycle has a parking locker; the parking locker engages the dock locker to lock the rental bicycle to the dock;

wherein when the parking locker of the rental bicycle engages the dock locker of the dock, the bicycle locking device of the rental bicycle is able to engage a pin into a locking apparatus of another rental bicycle to lock the rental bicycles in series.

4. The bicycle rental system of claim 3, wherein the control system transmits an unlocking signal to the controlling apparatus of the rental bicycle via the transceiver module to drive the locking apparatus to unlock the rental bicycle.

\* \* \* \* \*